United States Patent
Suzuki et al.

[11] Patent Number: 5,579,171
[45] Date of Patent: Nov. 26, 1996

[54] ZOOM LENS EQUIPPED WITH THE IMAGE STABILIZING FUNCTION

[75] Inventors: Kenzaburo Suzuki, Tokyo; Masahiro Nakatsuji, Machida; Keiji Moriyama, Yokohama, all of Japan

[73] Assignee: Nikon Corporation, Tokyo, Japan

[21] Appl. No.: 563,908

[22] Filed: Nov. 22, 1995

Related U.S. Application Data

[63] Continuation of Ser. No. 208,857, Mar. 11, 1994, abandoned.

[30] Foreign Application Priority Data

Mar. 30, 1993 [JP] Japan .................................. 5-93816
Mar. 30, 1993 [JP] Japan .................................. 5-93817

[51] Int. Cl.$^6$ .................................................. G02B 27/64
[52] U.S. Cl. ..................... 359/687; 359/774; 359/554; 359/557
[58] Field of Search ................................. 359/687, 554, 359/557, 686, 555, 556, 771, 774

[56] References Cited

U.S. PATENT DOCUMENTS 5,040,881 8/1991 Tsuji ........................................ 359/557
5,121,978 6/1992 Maruyama ............................... 359/557
5,249,079 9/1993 Umeda ..................................... 359/554
5,270,857 12/1993 Oizumi et al. ........................... 359/554

*Primary Examiner*—David C. Nelms
*Assistant Examiner*—Vu A. Le
*Attorney, Agent, or Firm*—Shapiro and Shapiro

[57] ABSTRACT

A zoom lens having a four-unit lens construction with positive, negative, positive, and positive refractive powers. In an embodiment, the second lens unit is moved toward the image side during the magnification change from the wide angle end to the telephoto end, and the third lens unit is moved in a direction substantially orthogonal to the optical axis to effect image stabilization. The zoom lens satisfies the condition that $\Delta Y = f_4/f_3 \cdot \Delta S$. In another embodiment, the first, third, and fourth lens units are moved toward the object side during the magnification change from the wide angle end to the telephoto end, and the second lens unit is moved in a direction substantially orthogonal to the optical axis to effect image stabilization. The zoom lens satisfies the condition that $\Delta Y = (1-\beta_2) \cdot \beta_{34} \cdot \Delta S$.

32 Claims, 6 Drawing Sheets

ZOOM LENS EQUIPPED WITH THE IMAGE STABILIZING FUNCTION

This is a continuation of application Ser. No. 08/208,857 filed Mar. 11, 1994, now abandoned.

BACKGROUND OF THE INVENTION

1. Field of the Invention

This invention relates to a zoom lens equipped with the image stabilizing function.

2. Related Background Art

Zoom lenses equipped with the image stabilizing function according to the prior art have included a zoom lens comprised of two or more lens units as disclosed in U.S. Pat. No. 5,270,857 wherein any lens units (particularly first and fourth lens units) are displaced across the optical axis for image stabilization to thereby correct the imaging state, and a zoom lens as disclosed in U.S. Pat. No. 5,040,881 wherein during zooming, only some lens groups in a fixed first lens unit are moved to thereby correct the imaging state.

The above-described prior art, however, presupposes that it is used in small cameras such as so-called compact cameras, and suffers from the following problems when it is utilized as the lens of a so-called single-lens reflex camera.

Firstly, if the construction of such prior art is intactly applied to a lens for a single-lens reflex camera, there will arise a problem that the back focal length generally required cannot be secured sufficiently. Further, the zoom lens of the construction shown in the above-described example of the prior art suffers from a disadvantage that a great zoom ratio cannot be secured, and it is impossible to make a zoom lens equipped with the image stabilizing function having a zoom ratio equal to that of zoom lenses commercially available as interchangeable lenses for single-lens reflex cameras.

SUMMARY OF THE INVENTION

The present invention has been made in order to solve the above-noted problems, and has as its object the provision of a zoom lens which is applicable as a lens for ordinary photography and is equipped with the image stabilizing function and yet compact and high in performance.

(A) First Invention

In order to solve the above-noted problems, a zoom lens equipped with the image stabilizing function as a first invention of this application has, in succession from the object side, a first lens unit G1 having positive refractive power, a second lens unit G2 having negative refractive power, a third lens unit G3 having positive refractive power, and a fourth lens unit G4 having positive refractive power, the second lens unit G2 being moved toward the image side for the purpose of magnification change during the magnification change from the wide angle end to the telephoto end, and is provided with image position displacing means for moving the third lens unit G3 in a direction substantially orthogonal to the optical axis to thereby effect image stabilization, and satisfies the relation of the following expression:

$$\Delta Y = f_4/f_3 \cdot \Delta S,$$

where $\Delta S$ is the amount of movement of the third lens unit G3 in the direction substantially orthogonal to the optical axis, $f_3$ is the focal length of the third lens unit, $f_4$ is the focal length of the fourth lens unit, and $\Delta Y$ is the amount of movement of the image during magnification change.

(B) Second Invention

In order to achieve above object, a zoom lens equipped with the image stabilizing function as a second invention of this application has, in succession from the object side, a first lens unit G1 having positive refractive power, a second lens unit G2 having negative refractive power, a third lens unit G3 having positive refractive power, and a fourth lens unit G4 having positive refractive power, the first lens unit G1, the third lens unit G3 and the fourth lens unit G4 being moved toward the object side during the magnification change from the wide angle end to the telephoto end, and is provided with image position displacing means for displacing the second lens unit G2 in a direction substantially orthogonal to the optical axis to thereby effect image stabilization, and is characterized in that it satisfies the relation of the following expression:

$$\Delta Y = (1-\beta_2) \cdot \beta_{34} \cdot \Delta S,$$

where $\Delta S$ is the amount of movement of the second lens unit G2 in the direction substantially orthogonal to the optical axis, $\beta_2$ is the image magnification of the second lens unit G2, $\beta_{34}$ is the combined image magnification of the third lens unit G3 and the fourth lens unit G4, and $\Delta Y$ is the amount of movement of the image.

(A) First Invention

The first invention adopts a zoom lens basically comprising a so-called four-unit construction having, in succession from the object side, positive, negative, positive and positive refractive powers so as to be suitable particularly for a photographic telephoto zoom lens, and is equipped with the image stabilizing function of a type in which the third lens unit is moved in a direction orthogonal to the optical axis to thereby vary the imaging position. The features and advantages of the zoom lens of this type will hereinafter be described briefly.

In photographic telephoto zoom lenses, the zoom types of positive, negative, positive, positive four-unit construction are the mainstream. The typical type among them is a type in which three units on the object side together constitute an afocal zoom converter. This will now be described as an example.

This four-unit zoom type is a four-unit construction comprising lens units having, from the object side, positive, negative, positive and positive refractive powers, and the second lens unit has the magnification changing action and the third lens unit has the action of correcting the movement of the image plane. Further, during magnification change, the second lens unit and the third lens unit are moved and the flux of rays between the third lens unit to the fourth lens unit is parallel, and the first lens unit and the fourth lens unit are fixed.

The zoom lens of this type can secure up to about four times as the magnification change ratio and further, has a good imaging performance. In addition, in its mechanism, it has the advantages that the number of lens units movable during magnification change is small and that if focusing is effected by the first lens unit or the fourth lens unit, they could be separated from the lens units used during magnification change. Thus, in contrast with telephoto zoom lenses, this four-unit zoom lens type has been widely used.

The present invention relates to improvements in such a four-unit zoom lens type. It has found optimum conditions as a zoom lens equipped with the image stabilizing function, and description will hereinafter be made in detail of the fact that particularly, an image stabilizing zoom lens is constructed with the third lens unit as an image stabilizing unit, and the conditions therefor.

Firstly, it is to be understood that a system in which the lens units or the lens is shifted in a direction substantially orthogonal to the optical axis is adopted as the image stabilizing technique of the image stabilizing zoom lens according to the present invention. That is, it is a system in which the amount of deviation of the whole optical axis caused by camera shake or the like is corrected by moving the lens units in the optical system or the lens by an appropriate amount in the direction substantially orthogonal to the optical axis to thereby vary the imaging position.

Description will now be made of the lens units or the lens to be shifted during image stabilization. In ordinary telephoto zoom lenses, the first lens unit is the largest lens unit and often is axially moved (moved toward the object side) during focusing. Therefore, it is not preferable to make the first lens unit a correcting optical system displaceable relative to the optical axis for the purpose of image stabilization because if a holding mechanism and a driving mechanism are added, the first lens unit will become larger.

Also, the fourth lens unit has a relatively great full length and has a large lens diameter and therefore, again, the holding mechanism and driving mechanism will become bulky, and this is not preferable. Accordingly, in the positive, negative, positive, positive four-unit zoom type according to the present invention, it is likewise not preferable to make the first lens unit or the fourth lens unit into a correcting optical system for image stabilization.

Next, comparing the second lens unit and the third lens unit with each other, both are common in that they are compact, but as previously described, the four-unit afocal type is characteristic in that the magnification in the third lens unit is infinite and constant during magnification change, in other words, the third lens acts to emit parallel rays of light always during magnification change.

Therefore, the focal length of the third lens unit becomes greater than that of the second lens unit and thus, the apparent F number thereof becomes dark, and for this reason, it is possible to make the third lend unit simpler in lens construction than the second lens unit. Also, for the eccentricity of the lens which is one of the errors of lens manufacture, the third lens unit is generally looser in its influence upon the imaging characteristic and therefore, it is suited for the system of the image stabilizing mechanism in which the lens is shifted. In addition, the lens units near an aperture stop are relatively small in lens diameter because fluxes of rays of respective angles of views densely collect there.

Accordingly, even if the image stabilizing function is added to such third lens unit to thereby make a correcting optical system which is displaceable relative to the optical axis, the holding mechanism and driving mechanism therefor will not become bulky and therefore, the whole construction including the correcting system can be simplified and thus, from the demand for compactness as well, this is convenient for using the third lens unit as an image stabilizing lens unit. Further, in the third lens unit, in terms of aberrations as well, it is possible to correct the image position without giving a great difference between the variations in quality of image in the central portion and the marginal portion.

From this, in the present invention, it has been found that it is optimum to make the third lens unit an image stabilizing unit.

In addition, when in the construction as described above, the amount of movement of the third lens unit in a direction substantially perpendicular to the optical axis is $\Delta S$ and the then amount of movement of the image is $\Delta Y$, the relation of the following expression (1) is established, and then the amount of movement is constant irrespective of the zoom position.

$$\Delta Y = f_4/f_3 \cdot \Delta S \tag{1}$$

Expression (1) shows that the amount of movement of the third lens unit is determined by the combined lateral magnification of the third lens unit and fourth lens unit. This condition is a condition which is established in the case of the aforedescribed four-unit afocal type, and it is apparent from this condition that the present invention is particularly suitable for a zoom lens of this type.

Also, when the lens unit is displaced in the direction substantially orthogonal to the optical axis for the image stabilizing operation, a flux of light unnecessary for imaging may be transmitted in the optical axis to the marginal portion of the image stabilizing lens unit and enter an image pickup surface. Therefore, a flare stop fixed relative to the optical axis is provided discretely from the aperture stop of the lens system to thereby effectively intercept such unnecessary rays of light in the marginal portion.

In the case of such a construction which can intercept the unnecessary light in the marginal portion during the image stabilizing movement of the image stabilizing lens unit, the location at which the flare stop is formed is not specifically restricted, but a plurality of flare stops may further be provided.

Next, the invention defined in appended claim 2 satisfies the following conditions in the above-described construction:

$$0.5 < f_3/(f_W f_T)^{1/2} < 1 \tag{2}$$

$$\Delta Smax/f_3 < 0.1 \tag{3}$$

Expression (2) above prescribes the appropriate focal length range of the third lens unit having the image stabilizing function added thereto. If the upper limit of expression (2) is exceeded, the focal length of the third lens unit will become too great and therefore, the lens diameter and aperture diameter thereof will become large, and this is against the demand for compactness. In addition, if as in an ordinary zoom lens, a stop is disposed near the fourth lens unit, the principal ray of light will become far from the optical axis in the first lens unit and therefore, again the lens diameter will become large, thus resulting in an increase in the diameter of the fare lens, and this is not preferable.

If conversely, the lower limit of expression (2) is exceeded, the focal length of the third lens unit will become too small and therefore, the spacing between the second lens unit and the third lens unit will narrow, and there will arise a problem that it becomes difficult to secure the movement space for the lens units during magnification change and it becomes difficult to secure a sufficient zoom ratio. In addition, Petzval sum will become liable to deflect in the positive direction and a good imaging performance will not be obtained. With regard to the condition of this expression (2), being within the range of 0.6 to 0.8 is preferable, but no problem in practical use will arise if within the range of the condition of equation (1).

Expression (3) appropriately prescribes the maximum amount of movement of the third lens unit during image stabilization from the relation (ratio) with the focal length of the third lens unit. If the upper limit of expression (3) is exceeded, the amount of movement of the third lens unit during image stabilization will become too great and as a result, the amount of aberration fluctuation during image stabilization will become too great and the correction thereof will become difficult. Particularly, there will arise a problem that the difference in the direction of the optical axis between the best image plane in m (meridional) direction and the best image plane in S (sagittal) direction at the marginal location on the image plane will widen. Also, the mechanism for image stabilization will become complex, thus readily resulting in the bulkiness of the entire zoom lens, and this will pose problems in manufacture and is against the demand for compactness. The smaller is the conditional value of this expression (3), the more preferable, but if it is within the range of this condition, the correction of aberrations or the like will be possible from the other design conditions.

In addition to the above-described conditions, it is desirable in order to achieve a more excellent performance that the image stabilizing zoom lens according to the present invention satisfy the following conditional expressions:

$$0.5 < r_t/f_3 < 20 \quad (4)$$

$$L/f_W < 0.3 \quad (5)$$

where $r_t$ is the radius of curvature of the object side surface of that convex lens in the third lens unit which is most adjacent to the image side, and L is the full length (the length as measured along the optical axis) of the image stabilizing lens unit.

If the range (the upper limit or the lower limit) of expression (4) is exceeded, the fluctuation of spherical aberration and the fluctuations of curvature of image field and astigmatism will become excessively great during magnification change. During image stabilization also, the fluctuations of spherical aberration and coma will become excessively great, and the aberration correction based thereon will become difficult, and this is inconvenient.

If the upper limit of expression (5) is exceeded, the full length of the image stabilizing lens unit will become great and the weight thereof will increase and also, there will arise an inconvenience that the mechanism system for image stabilization becomes complex and bulky.

A control system for the image stabilizing mechanism will now be described.

To correct the amount of deflection ΔW of the optical axis considered on the object side of the zoom lens, irrespective of the zoom position, it is to be understood that the focal length of the whole system at any zoom position is $f_Z$ and this is shown by Z times relative to the focal length $f_W$ at the wide angle end ($f_Z=f_W \cdot Z$).

If this parameter Z is used, when the amount of correction for the angle of deflection ΔW of the optical axis at the wide angle end is $\Delta S_W$, it is necessary to control the amount of correction so that the amount of displacement $\Delta S_Z$ of the image stabilizing unit at any zoom position may be shown by the following expression (6):

$$\Delta S_Z = \Delta S_W \cdot Z \quad (6)$$

To control the image stabilizing mechanism so as to satisfy this expression (6), it is necessary to mount a rotary encoder or the like, for example, on the second lens unit or the third lens unit so that said Z may be obtained, and to provide means for reading the angle of rotation. Various other algorithms of the control system are conceivable, but here is shown the most standard algorithm.

Now, when the third lens unit is to be actually constructed, it is desirable to adopt a construction including at least one convex lens and a concave lens. Where the third lens unit is constructed of a convex lens and a concave lens, these lenses are made into a cemented lens, and where the third lens unit is constructed of three or more lenses, it is made into a construction having a cemented lens on the image side, whereby the fluctuations of various aberrations during image stabilization are reduced.

At this time, the cemented surface is made convex toward the image side, whereby it is possible to minimize the fluctuations of curvature of image field and astigmatism during magnification change and at the same time, the fluctuations of various aberrations during image stabilization can also be suppressed.

Further, to obtain a zoom lens which can achieve good achromatism in order to obtain an excellent imaging performance during magnification change and during image stabilization and which has an excellent imaging performance, it is preferable to satisfy the conditions of the following expressions (7) and (8):

$$0.1 < \Delta nd < 0.4 \quad (7)$$

$$15 < \Delta vd < 50 \quad (8)$$

where Δnd is the average value of the refractive index of the concave lens constituting the third lens unit, minus the average value of the refractive index of the convex lens, and Δvd is the average value of the Abbe number of the convex lens constituting the third lens unit, minus the average value of the Abbe number of the concave lens.

Expression (7) is a condition for correcting spherical aberration well during magnification change and during image stabilization. By satisfying this condition, it also becomes possible to correct the Petzval sum of the whole zoom lens well. If the range of this expression (7) is exceeded, spherical aberration will occur greatly and further, astigmatism and the bending of the image plane will become very great, and this will give rise to a problem that a good imaging characteristic is not obtained.

Expression (8) shows the range of Abbe number for achromatizing the third lens unit well. If this range is departed from, color misregistration will occur and therefore, not only it will become difficult to obtain a good imaging characteristic, but also the correction of various aberrations will become difficult.

Also, by adopting an aspherical surface as the lens surface in the third lens unit, a more excellent imaging performance can be attained. Particularly, if an aspherical surface is applied to that surface of the third lens unit which is most adjacent to the object side, the effect of improving the imaging characteristic will become great.

As described above, the present invention is one in which a suitable image stabilizing function is added to a zoom lens comprising a so-called four-unit construction having, in succession from the object side, positive, negative, positive and positive refractive powers, and saying in addition, it is equipped with an image stabilizing function best suited for the type in which an afocal zoom converter is constituted by three lens units on the object side.

To make a zoom lens of the four-unit type constituting such an afocal system, the image position by the first lens unit and the second lens unit and the object side focal position of the third lens unit are made spatially coincident with each other, whereby the portion between the third lens unit and the fourth lens unit can be made into an afocal system.

By adopting an image stabilizing mechanism in the third lens unit of such an afocal zoom converter, there can be provided a zoom lens having both of a very good imaging characteristic and a very good image stabilizing function.

(B) Second Invention

The second invention is a zoom lens equipped with the image stabilizing function which can be utilized in a popular photographic camera and which comprises a so-called four-unit construction having, in succession from the object side, positive, negative, positive and positive refractive powers, and is equipped with the image stabilizing function of the type in which the second lens unit is moved in a direction orthogonal to the optical axis to thereby vary the imaging position. The features and advantages of the zoom lens of this type will hereinafter be described briefly.

To construct the zoom lens, it is necessary to move at least two lens units in order to vary the focal length (magnification) and correct the movement of the image plane to thereby fix the imaging position. A zoom lens of the type in which three or more lens units are moved to thereby effect magnification change is herein called a multiunit zoom lens. As an advantage of the multiunit zoom lens type, it may be mentioned that the degree of freedom of the selection of the way in which each lens unit is moved is wide and therefore the degree of freedom of aberration correction is great and besides the aberration correction of individual lens units, it is also possible to effect aberration correction of all lens units and thus, it is easy to obtain an excellent imaging characteristic. Further, it is possible to adopt a system in which the full length is short at the wide angle end and the full length is increased when magnification change is effected to the telephoto end. Thereby, the shortening of the full length of the lens system particularly at the wide angle end (the downsizing of the zoom lens) can be achieved.

Also, the zoom lens comprising four positive, negative, positive and positive lens units equipped with the image stabilizing function which is proposed by the present invention is a compact zoom lens having an excellent imaging characteristic in the standard region and the telephoto region, particularly as a popular 35 mm photographic lens and also equipped with the image stabilizing function.

It is to be understood here that as a technique for the image stabilizing function of the zoom lens according to the present invention, there is adopted a system in which a lens unit or the lens is moved in a direction substantially orthogonal to the optical axis to thereby correct the imaging position. When an attempt is made to provide a practical image stabilizing zoom lens by this system, it is important that image stabilization displacing means is simple in mechanism. For that purpose, it is important that the image stabilizing unit of the optical system is fixed or the amount of movement thereof is small.

That is, where in order to add the image stabilizing function as described above, an image stabilizing mechanism is added to the lens unit movable in the direction of the optical axis during magnification change, it is necessary to add a mechanism for image stabilization and a mechanism for magnification change to the same lens unit and therefore, the construction of this lens unit becomes complicated. Further, in the case of a zoom lens in which the amount of movement in the direction of the optical axis is great, movement is effected in both of the direction of the optical axis and a direction orthogonal thereto and therefore, a correcting mechanism conforming to each amount of movement becomes necessary and the construction thereof becomes complicated.

For this reason, according to the present invention, the lens system is constructed with the first, third and fourth lens units as the units movable in the direction of the optical axis, whereby the amount of movement of the second lens unit in the direction of the optical axis during magnification change can be greatly decreased and even when the second lens unit is fixed, a zoom lens system can be constructed.

Further, by such construction of the lens system, the aperture of the second lens unit of the four lens units can be made smallest and therefore, even if the image stabilizing function is added, the outer diameter of the lens (the diameter of the lens barrel) will not become large, but the downsizing of the zoom lens can be achieved.

To make such construction of the zoom lens system possible, when the amount of movement of the second lens unit G2 in a direction substantially orthogonal to the optical axis is $\Delta S$ and the image magnification of the second lens unit G2 is $\beta_2$ and the combined image magnification of the third lens unit G3 and the fourth lens unit G4 is $\beta_{34}$ and the amount of movement of the image is $\Delta Y$, it becomes necessary to satisfy the relation of the following expression (9):

$$\Delta Y = (1-\beta_2) \cdot \Delta_{34} \cdot \Delta S \qquad (9)$$

Here, when $\Delta Y$ and $\Delta S$ are of the positive sign, it means the upward direction in the view of the optical path (the lens construction view), and when $\Delta Y$ and $\Delta S$ are of the negative sign, it means the downward direction.

Next, in the invention defined in appended claim 12, when the focal length of the second lens unit G2 is $f_2$ and the focal length of the zoom lens at the wide angle end is $f_W$ and the focal length of the zoom lens at the telephoto end is $f_T$ and the maximum amount of displacement of the second lens unit G2 during image stabilization is $\Delta Smax$ and the amount of movement of the second lens unit G2 in the direction of the optical axis during the magnification changing operation is $\Delta_2$, the following conditions are satisfied:

$$0.15 < |f_2/(f_W f_T)^{1/2}| < 1.0 \qquad (10)$$

$$-0.1 < \Delta_2/f_W < 0.2 \qquad (11)$$

$$\Delta Smax/f_2 < 0.1 \qquad (12)$$

Expression (10) prescribes the appropriate range of the focal length of the second lens unit equipped with the image stabilizing mechanism. The most preferable numerical value of this range is of the order of 0.2 to 0.4, but when the tolerance of aberration is taken into account to some degree, the range prescribed by expression (10) will pose no problem in practical use.

If the upper limit of this expression (10) is exceeded, the refractive power of the second lens unit will become too weak and there will arise a problem that not only spherical aberration becomes negative (−), but also Petzval sum is liable to move toward plus.

If conversely, the lower limit of expression (10) is exceeded, the refractive power of the second lens unit will become too strong and spherical aberration will be liable to become positive (+) and Petzval sum will become liable to move toward minus, and this is inconvenient for obtaining an excellent imaging characteristic. Further, the principal ray passing through the first lens unit will become much far from the optical axis and this will result in an increase in the aperture of the first lens unit, which is against the demand for the compactness of the zoom lens.

Expression (11) prescribes the amount of movement of the second lens unit in the direction of the optical axis during magnification change. If the range of this expression is exceeded, the amount of movement during magnification change will become too great and therefore, if an image stabilizing mechanism is added, the resultant lens construction will become complicated in mechanism. Further, in terms of aberration correction, the fluctuations of spherical aberration and curvature of image field during magnification change will become great, and this is not preferable. If the condition of this expression (11) is 0, that is, the second lens unit is fixed, it is of course most preferable in terms of mechanism, but if within the range of expression (11), there will arise no practical inconvenience in aberrations, etc.

Expression (12) prescribes the amount of movement of the second lens unit in the direction orthogonal to the optical axis during image stabilization. If the upper limit of expression (12) is exceeded, the amount of movement during image stabilization will become too great and the amount of aberration fluctuation during image stabilization will become too great and therefore, correction will become unable to be sufficiently effected. Particularly, there will arise a convenience that the difference in the direction of the optical axis between the best image plane in m (meridional) direction and the best image plane in s (sagittal) direction at the marginal position on the image plane becomes wider. Further, the moving mechanism will become large and this will give rise to the problem of the zoom lens barrel becoming bulky.

When only these advantages are taken into account, the smaller is the condition of expression (12), the more preferable, but if substantially up to the upper limit of this condition, the problem of downsizing will not arise from other conditions, etc. or it will be possible to effect good correction, for example, by a combination with an aspherical lens or the like.

A control system for the image stabilizing mechanism will now be described. To correct the amount of deflection (angle) $\Delta W$ of the optical axis considered on the object side of the zoom lens, irrespective of the zoom position, when the image magnification of the second lens unit at any zoom position is $\beta_2^Z$ and the image magnification of the second lens unit at the zoom position of the wide angle end is $\beta_2^W$ and the amount of correction (amount of displacement) of the second lens unit relative to the amount of deflection $\Delta W$ of the optical axis at the wide angle end is $\Delta S_W$, it is necessary to control the amount of correction (amount of displacement) $\Delta S_Z$ of the image stabilizing unit at any zoom position so as to keep the relation shown by the following expression (13):

$$\Delta S_Z = \Delta S_W \cdot \frac{\beta_2^Z}{\beta_2^W} \cdot \frac{1-\beta_2^W}{1-\beta_2^Z} \qquad (13)$$

For this control, it is necessary to have means for mounting rotary encoders or the like on the first, third and fourth lens units to read the individual angles of rotation thereof so that $\beta_2^Z$ may be obtained, having the relation between the angles of rotation and $\beta_2^Z$ as a reference table, and referring to it to thereby calculate $\beta_2^Z$. Other various algorithms of the control system are conceivable, but here is shown the most standard algorithm.

To obtain a better performance, it is desirable to satisfy the following conditions:

$$-1.7 < r_-/f_2 < -0.5 \qquad (14)$$

$$L/f_W < 0.5 \qquad (15)$$

where $r_-$ is the radius of curvature of the image side surface of that concave lens in the second lens unit which is most adjacent to the object side, and L is the full length of the image stabilizing lens unit on the optical axis (the length as measured along the optical axis).

If the range of this expression (14) is exceeded, the correction of lower coma and the correction of curvature of image field at the wide angle end will become difficult and further, the correction of spherical aberration at the telephoto end will become difficult. Furthermore, to obtain an excellent imaging characteristic, it is preferable that this conditional value be of the order of $-1.0$ to $-1.5$.

Also, if the range of expression (15) is exceeded, there will arise a problem that the full length of the image stabilizing unit becomes great and the lens construction becomes heavy to increase the weight of the lens system and the structure of the image stabilizing mechanism becomes bulky and complicated.

Further, in the invention defined in appended claim 13 or 14, a flare stop discrete from an aperture stop is provided in fixed relationship with the optical axis. When the second lens unit is moved in the direction orthogonal to the optical axis for the purpose of image stabilization, the flux of light at the marginal position remote from the optical axis may be incident as an unnecessary flux of light on the third lens unit or the fourth lens unit positioned rearwardly of the second lens unit, depending on the amount of movement thereof. Such unnecessary gives birth, for example, to ghost and unnecessary exposure or the like and therefore, the flare stop is provided in order to eliminate such harmful light.

The location at which this flare stop is disposed is not specifically restricted, but yet the location near the object side of the second lens unit will be most effective to eliminate the unnecessary light. At whatever location may be disposed the flare stop, it may be any one which can intercept the unnecessary light at the imaging position. The flare stop is not always necessary in the zoom lens according to the present invention, but yet it will effectively function depending on individual design conditions.

By adopting an aspherical surface in the second lens unit of the present invention, it is possible to attain a more excellent imaging performance. Also, if the second lens unit, the third lens unit and the fourth lens unit are used singly or in combination during focusing, inner focus and rear focus will be possible.

DETAILED DESCRIPTION OF THE PREFERRED EMBODIMENTS

Figure 1:
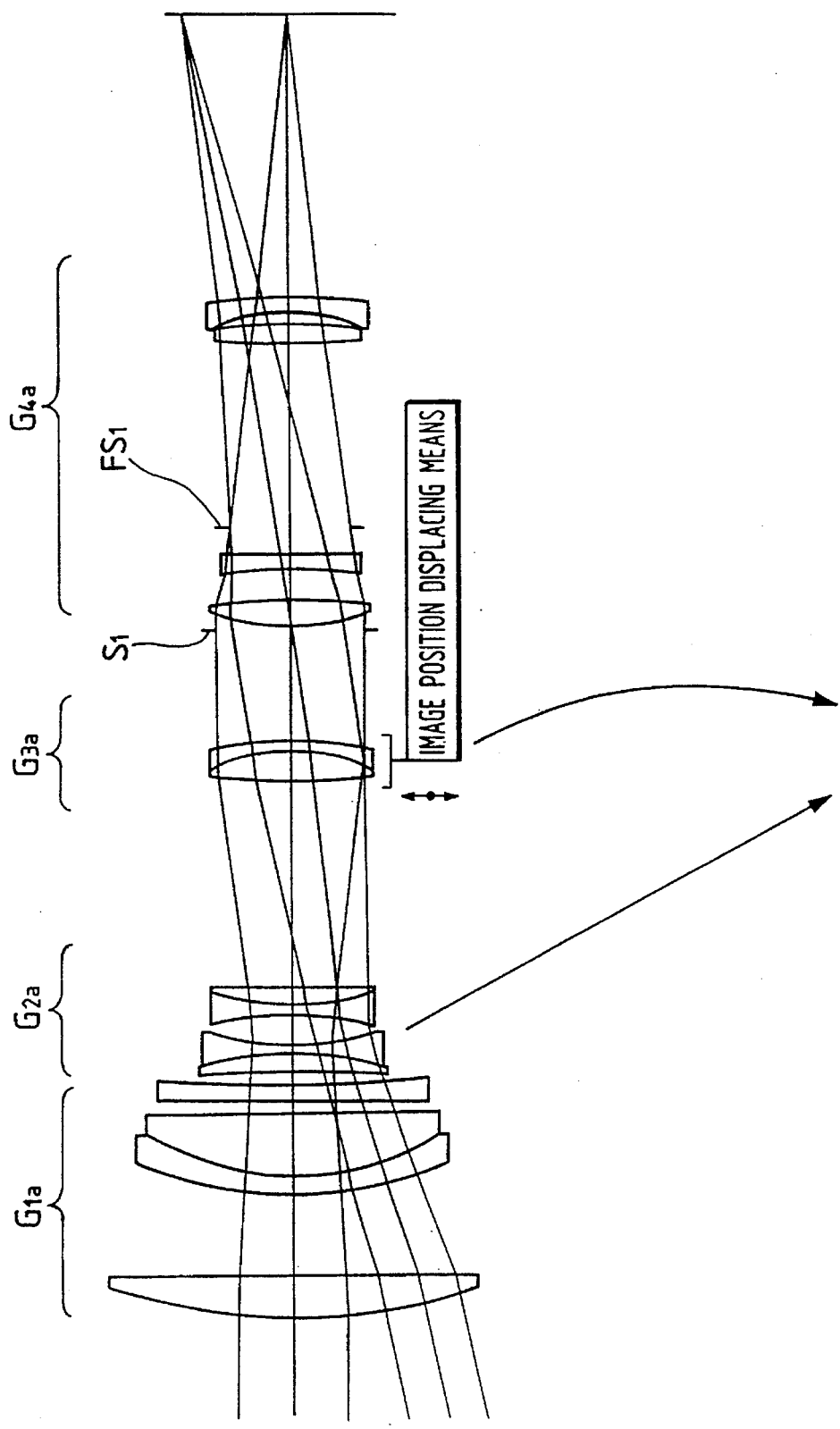
FIG. 1 is an illustration schematically showing the construction of an image stabilizing zoom lens according to a first embodiment of the present invention.

The first invention will hereinafter be described in greater detail with respect to some embodiments thereof. Any of first to third embodiments which will hereinafter be described has, in succession from the object side, a first lens unit G1 having positive refractive power, a second lens unit G2 having negative refractive power, a third lens unit G3 having positive refractive power, and a fourth lens unit G4 having positive refractive power, the second lens unit G2 being moved toward the image side for magnification change during the magnification change from the wide angle end to the telephoto end, and further has imaging position displacing means for moving said third lens unit G3 in a direction substantially orthogonal to the optical axis to thereby effect image stabilization, and satisfies the following condition;

$$\Delta Y = f_4/f_3 \cdot \Delta S, \quad (1)$$

where $\Delta S$ is the amount of movement of the third lens unit G3, $f_3$ is the focal length of the third lens unit G3, $f_4$ is the focal length of the fourth lens unit G4, and $\Delta Y$ is the amount of movement of the image.

Three embodiments of the present invention will be described herein, and any of them is an embodiment in which the present invention is applied to a zoom lens of the so-called four-unit afocal type, and the design numerical values of these three embodiments and the corresponding numerical values, etc. of each condition are shown in Table 1 below.

In the table below, the condition prescribed by expression (1) is a condition which is established without fail in a so-called four-unit afocal zoom lens, but for reference, only the numerical values at the telephoto end and the wide angle end are shown in the table. The numerical values are design values in the respective embodiments, and give birth to some errors, but satisfy the condition of expression (1) substantially exactly. Also, each embodiment is controlled so as to satisfy expression (6) with respect to the amount of image stabilization displacement of the third lens unit.

TABLE 1

| Conditional Expressions | Corresponding Mathematical Expressions, etc. | | 1st Embodiment 100–300 mm F4.5 | 2nd Embodiment 80–200 mm F4 | 3rd Embodiment 80–200 mm F2.8 |
|---|---|---|---|---|---|
| Expression (1) | $f_3$ | | 111.293 | 94.067 | 86.829 |
| | $f_4$ | | 135.821 | 112.523 | 113.000 |
| | $\Delta S$ | (W) | 0.273 | 0.223 | 0.207 |
| | | (T) | 0.819 | 0.544 | 0.502 |
| | $\Delta Y$ | (W) | 0.333 | 0.267 | 2.270 |
| | | (T) | 1.000 | 0.651 | 0.653 |
| Expression (2) | $f_3$ | | 111.293 | 94.067 | 86.829 |
| | $(f_W f_T)^{1/2}$ | | 173.032 | 124.964 | 125.956 |
| | $f_3/(f_W f_T)^{1/2}$ | | 0.643 | 0.753 | 0.689 |
| Expression (3) | $\Delta S_{max}$ | | 0.819 | 0.544 | 0.502 |
| | $f_3$ | | 111.293 | 94.067 | 86.829 |
| | $\Delta S_{max}/f_3$ | | 0.00687 | 0.00578 | 0.00578 |
| Expression (4) | $r_t$ | | +131.5 | +155 | +862.073 |
| | $f_3$ | | 111.293 | 94.067 | 86.829 |
| | $r_t/f_3$ | | 1.1816 | 1.65 | 9.928 |
| Expression (5) | L | | 8 | 6.4 | 13.9 |
| | $f_W$ | | 100 | 80 | 80.944 |
| | $L/f_W$ | | 0.08 | 0.08 | 0.172 |
| Expression (7) | $\Delta \bar{n}d$ | | 0.273 | 0.135 | 0.216 |
| Expression (8) | $\Delta \bar{v}d$ | | 23.467 | 32.708 | 28.836 |

The numerical values in expression (1) indicate the amount of image stabilization displacement $\Delta S$ of the third lens unit and the amount of movement $\Delta Y$ of the image at the wide angle end (W) and the telephoto end (T) in each embodiment.

Each embodiment of the present invention will hereinafter be described. The construction of an image stabilizing zoom lens according to the first embodiment of the present invention is schematically shown in FIG. 1. This embodiment is a typical application of the present invention, and the focal length thereof is 100 to 300 mm and the F (F number) thereof is F4.5.

This embodiment is a zoom lens of a four-unit construction comprising lens units G1a to G4a having, in succession from the object side, positive, negative, positive and positive refractive powers, and during the magnification change from the wide angle end to the telephoto end, the second lens unit G2a is moved toward the image side, and the third lens unit G3a is moved non-linearly. The first lens unit G1a and the fourth lens unit G4a are fixed to a lens barrel (not shown), and the flux of rays between the third lens unit G3a and the fourth lens unit G4a becomes a parallel system, and the second lens unit G2a has the magnification changing action and the third lens unit G3a has the action of correcting the movement of the image plane.

The third lens unit G3a comprises a combination of a convex lens and a concave lens, and is disposed with the convex surface thereof turned to the image side. Further, it is made movable in the direction orthogonal to the optical axis, and provision is made of control means for detecting the vibration or the like of the entire lens system and controlling the lens unit so as to effect predetermined displacement. As previously described, in this control means, the control of the amount of movement is effected so that the amount of image stabilization displacement of the third lens unit G3a may satisfy the aforementioned expression (6).

The aperture stop S1 of the image stabilizing zoom lens according to this embodiment is provided near the object side of the fourth lens unit G4a, and a fixed stop FS1 is provided more adjacent to the image side than the aperture stop S1. Discretely from these, a flare stop for intercepting unnecessary light at the marginal position far from the optical axis when the third lens unit G3a is displaced in the direction orthogonal to the optical axis during the image stabilizing operation may preferably be provided in fixed relationship with the optical axis.

The design numerical values of the respective lenses, etc. in the first embodiment are shown in Table 2 below. In Tables 2 to 4 and 6 to 8, the numbers at the left end indicate the order of the lens surfaces from the object side. Do represents the distance from the object to the fore end of the lens.

TABLE 2

| | Design Numerical Values, etc. in the First Embodiment | | | |
|---|---|---|---|---|
| Surface | Radius of Curvature | Inter-surface Spacing | Abbe Number | Refractive Index |
| 1 | 108.2000 | 8.8000 | 82.52 | 1.497820 |
| 2 | −4776.2252 | 15.8929 | | 1.000000 |
| 3 | 84.9000 | 3.2000 | 40.90 | 1.796310 |
| 4 | 55.8000 | 12.4000 | 82.52 | 1.497820 |
| 5 | 832.6739 | 2.5971 | | 1.000000 |
| 6 | 3300.0000 | 3.3000 | 35.19 | 1.749501 |
| 7 | 280.6838 | d7 | | 1.000000 |
| 8 | −515.0000 | 3.5000 | 28.19 | 1.740000 |
| 9 | −73.8500 | 2.0000 | 49.45 | 1.772789 |
| 10 | 59.0000 | 6.0000 | | 1.000000 |
| 11 | −63.0000 | 2.0000 | 53.93 | 1.713000 |
| 12 | 58.6000 | 3.5000 | 25.50 | 1.804581 |
| 13 | −3068.9296 | d13 | | 1.000000 |
| 14 | 131.5000 | 6.0000 | 48.97 | 1.531721 |
| 15 | −36.4000 | 2.0000 | 25.50 | 1.804581 |
| 16 | −64.5181 | d16 | | 1.000000 |

TABLE 2-continued

Design Numerical Values, etc.
in the First Embodiment

| Surface | Radius of Curvature | Inter-surface Spacing | Abbe Number | Refractive Index |
|---|---|---|---|---|
| 17 | ∞ | 1.0000 | | 1.000000 |
| 18 | 45.4200 | 5.5000 | | 1.497820 |
| 19 | −103.4220 | 6.2000 | | 1.000000 |
| 20 | −83.9500 | 3.0000 | 31.08 | 1.688930 |
| 21 | −3732.2486 | 5.0000 | | 1.000000 |
| 22 | ∞ | 37.0000 | | 1.000000 |
| 23 | 195.0000 | 3.5000 | 29.46 | 1.717360 |
| 24 | −141.2622 | 3.0000 | | 1.000000 |
| 25 | −35.1500 | 3.0000 | 58.50 | 1.651599 |
| 26 | −110.5743 | Bf | | 1.000000 |

Variations in the spacing in the magnification change in Table 2 above are shown below.

| | Wide Angle End (W) | Telephoto End (T) |
|---|---|---|
| f | 100.00 | 299.40 |
| Do | ∞ | ∞ |
| d7 | 2.79132 | 55.3838 |
| d13 | 41.4728 | 2.2453 |
| d16 | 21.8264 | 8.4614 |
| Bf | 56.5115 | 56.5115 |

The second embodiment of the present invention will now be described. This embodiment is one in which the present invention is applied to a zoom lens somewhat closer to the wide angle side than the above-described first embodiment, and the focal length thereof is 80 to 200 mm and the F number thereof is F4.

Figure 2:
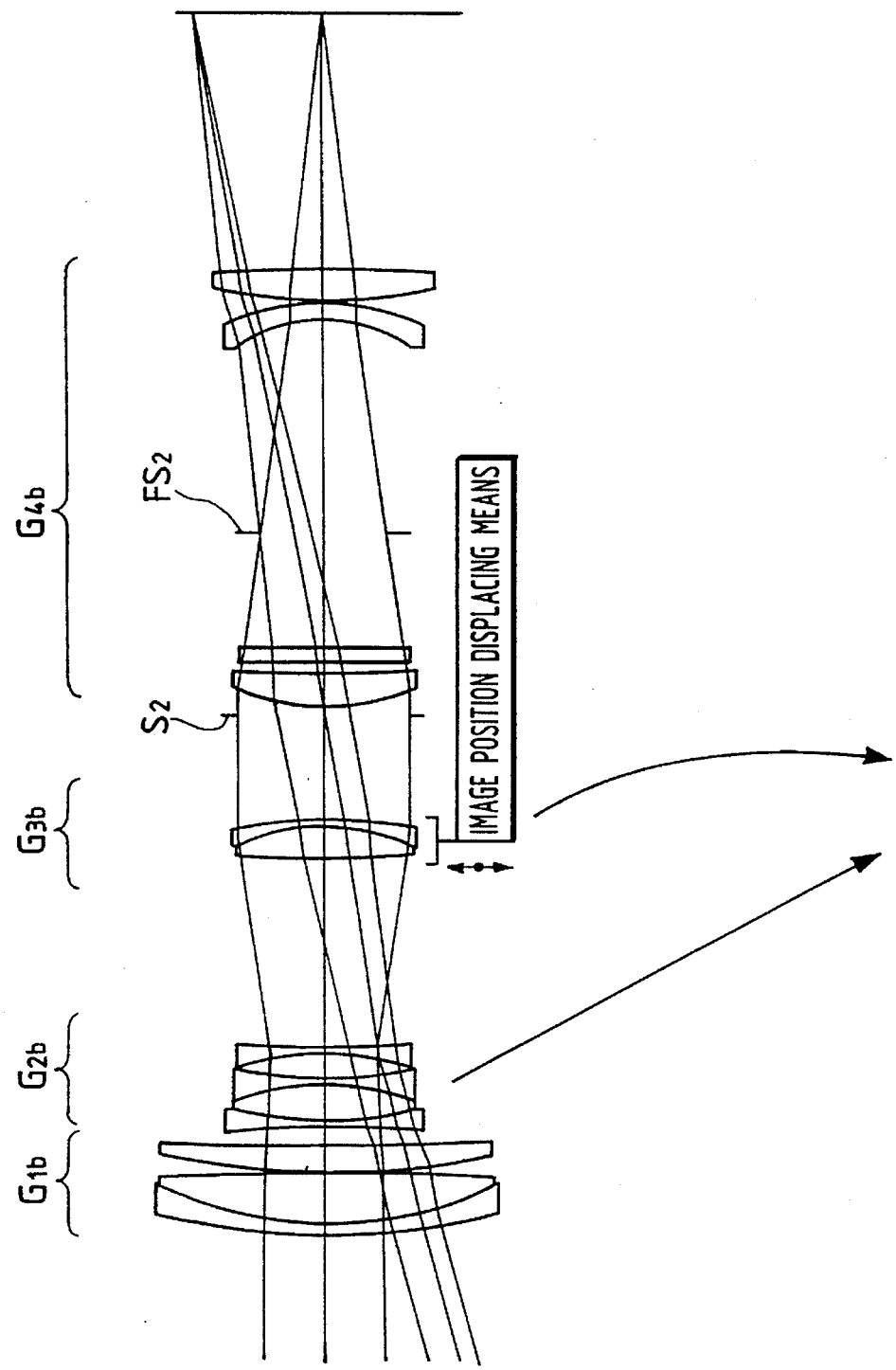
FIG. 2 is an illustration schematically showing the construction of an image stabilizing zoom lens according to a second embodiment of the present invention.

The construction of the image stabilizing zoom lens according to this embodiment is schematically shown in FIG. 2, and like the above-described first embodiment, this embodiment is a zoom lens of four-unit construction comprising lens units G1b to G4b having, in succession from the object side, positive, negative, positive and positive refractive powers, and during the magnification change from the wide angle end to the telephoto end, the second lens unit G2b is moved toward the image side, and the third lens unit G3b is moved non-linearly. The first lens unit G1b and the fourth lens unit G4b are fixed to a lens barrel (not shown), and the flux of rays between the third lens unit G3b and the fourth lens unit G4b becomes a parallel system, and the second lens unit G2b has the magnification changing action and the third lens unit G3b has the action of correcting the movement of the image plane.

The third lens unit G3b in the second embodiment comprises a combination of a convex lens and a concave lens, and is disposed with the convex surface thereof turned to the image side. Further, it is made movable in the direction orthogonal to the optical axis, and provision is made of control means for detecting the vibration or the like of the entire lens system and controlling the lens unit so as to effect predetermined displacement. The amount of image stabilization displacement in this embodiment is controlled so as to satisfy the aforementioned expression (6).

The aperture stop S2 of the image stabilizing zoom lens system according to this embodiment is provided near the object side of the fourth lens unit G4b, and a fixed stop FS2 is provided more adjacent to the image side than the aperture stop S2. Discretely from these, a flare stop for intercepting unnecessary light at the marginal position far from the optical axis when the third lens unit G3b is displaced in the direction orthogonal to the optical axis during the image stabilizing operation may preferably be provided in fixed relationship with the optical axis.

The design numerical values of the respective lenses, etc. in the second embodiment are shown in Table 3 below.

TABLE 3

Design Numerical Values, etc.
in the Second Embodiment

| Surface | Radius of Curvature | Inter-surface Spacing | Abbe Number | Refractive Index |
|---|---|---|---|---|
| 1 | 109.0970 | 1.7000 | 25.35 | 1.805180 |
| 2 | 62.6500 | 8.1000 | 60.35 | 1.620410 |
| 3 | −716.0000 | .1000 | | 1.000000 |
| 4 | 132.8550 | 4.0000 | 63.37 | 1.510090 |
| 5 | 607.3523 | d5 | | 1.000000 |
| 6 | −300.0000 | 1.0000 | 47.47 | 1.787970 |
| 7 | 53.0000 | 6.1000 | 27.61 | 1.755200 |
| 8 | −40.0000 | 4.1000 | | 1.581440 |
| 9 | 56.3310 | 4.1000 | | 1.000000 |
| 10 | −44.3500 | 1.1000 | 61.09 | 1.589130 |
| 11 | 179.1653 | d11 | | 1.000000 |
| 12 | 155.0000 | 5.5000 | 60.35 | 1.620410 |
| 13 | −31.7920 | .9000 | 27.61 | 1.755200 |
| 14 | −68.9169 | d14 | | 1.000000 |
| 15 | ∞ | 1.5000 | | 1.000000 |
| 16 | 41.6670 | 5.3000 | 57.53 | 1.670250 |
| 17 | 217.9000 | 2.0000 | | 1.000000 |
| 18 | −692.4730 | 2.0000 | 28.56 | 1.795040 |
| 19 | 299.7350 | 18.5000 | | 1.000000 |
| 20 | ∞ | 34.9000 | | 1.000000 |
| 21 | −23.3440 | 2.4000 | 44.69 | 1.802180 |
| 22 | −36.1580 | 0.2000 | | 1.000000 |
| 23 | 72.0000 | 5.3000 | 46.42 | 1.582670 |
| 24 | −331.3933 | Bf | | 1.000000 |

Variations in the spacings in the magnification change in Table 3 above are shown below.

| | Wide Angle End (W) | Telephoto End (T) |
|---|---|---|
| f | 80.00 | 195.20 |
| Do | ∞ | ∞ |
| d5 | 3.034 | 43.1505 |
| d11 | 30.9642 | 1.3584 |
| d14 | 17.2245 | 6.7138 |
| Bf | 41.3804 | 41.3807 |

The third embodiment of the present invention will now be described. This embodiment is one in which the present invention is applied to a relatively bright telephoto zoom lens, and the focal length thereof is 80 to 200 mm and the F number thereof is F2.8.

Figure 3:
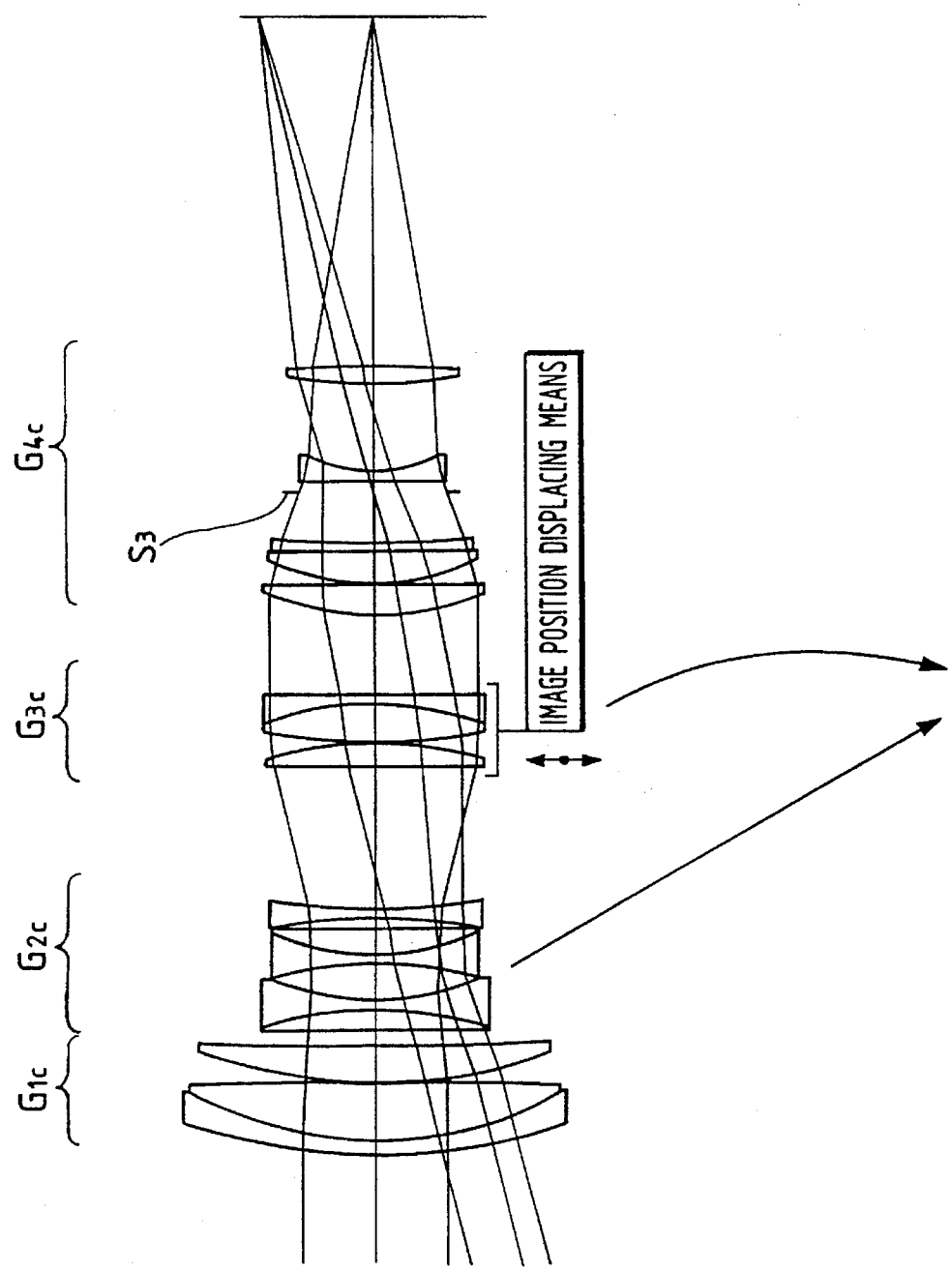
FIG. 3 is an illustration schematically showing the construction of an image stabilizing zoom lens according to a third embodiment of the present invention.

The construction of an image stabilizing zoom lens according to the third embodiment is schematically shown in FIG. 3, and like the above-described embodiments, this embodiment is a zoom lens of four-unit construction comprising lens units G1c to G4c having, in succession from the object side, positive, negative, positive and positive refractive powers, and during the magnification change from the wide angle end to the telephoto end, the second lens unit G2c is moved toward the image side, and the third lens unit G3c is moved non-linearly. The first lens unit G1c and the fourth lens unit G4c are fixed to a lens barrel (not shown), and the flux of rays between the third lens unit G3c and the fourth lens unit G4c becomes a parallel system, and the second lens unit G2c has the magnification changing action and the third lens unit G3c has the action of correcting the movement of the image plane.

The third lens unit G3c in the third embodiment comprises three lenses, i.e., a combination of a convex lens and a concave lens, and another convex lens, and is disposed with the convex side of the combination lens turned to the image plane side and more adjacent to the image side than the single convex lens.

Further, the third lens unit G3c is made movable in the direction orthogonal to the optical axis, and provision is made of control means for detecting the vibration or the like of the entire lens system and controlling the lens unit so as to effect predetermined displacement. Again in this embodiment, the amount of image stabilization displacement is controlled so as to satisfy the aforementioned expression (6).

In the third embodiment, an aperture stop S3 is provided in the intermediate portion of the fourth lens unit G4c, and discretely therefrom, a flare stop for intercepting unnecessary light at the marginal position far from the optical axis when the third lens unit G3c is displaced in the direction orthogonal to the optical axis during the image stabilizing operation may preferably be provided in fixed relationship with the optical axis.

The design numerical values of the respective lenses, etc. in the third embodiment are shown in Table 4 below.

TABLE 4

Design Numerical Values, etc. in the Third Embodiment

| Surface | Radius of Curvature | Inter-surface Spacing | Abbe Number | Refractive Index |
|---|---|---|---|---|
| 1 | 106.7776 | 3.0000 | 25.43 | 1.805180 |
| 2 | 74.3190 | 10.3000 | 82.52 | 1.497820 |
| 3 | −2628.0539 | 0.2000 | | 1.000000 |
| 4 | 103.0273 | 7.2000 | 82.52 | 1.497820 |
| 5 | 2353.7795 | d5 | | 1.000000 |
| 6 | −661.7340 | 3.9000 | 35.70 | 1.625880 |
| 7 | −73.9930 | 1.6000 | 60.69 | 1.563840 |
| 8 | 48.2142 | 7.1000 | | 1.000000 |
| 9 | −65.9114 | 1.5000 | 64.10 | 1.516800 |
| 10 | 52.9250 | 4.7000 | 25.50 | 1.804580 |
| 11 | 500.0781 | 2.5000 | | 1.0000 |
| 12 | −92.9982 | 1.6000 | 53.93 | 1.713000 |
| 13 | 213.3106 | d13 | | 1.000000 |
| 14 | 862.0732 | 4.5000 | 60.23 | 1.518350 |
| 15 | −67.7278 | 0.2000 | | 1.000000 |
| 16 | 104.0599 | 7.5000 | 60.69 | 1.563840 |
| 17 | −52.8470 | 1.7000 | 31.62 | 1.756920 |
| 18 | −545.6405 | d18 | | 1.000000 |
| 19 | 50.1843 | 5.8000 | 82.52 | 1.497820 |
| 20 | 848.3647 | 0.2000 | | 1.000000 |
| 21 | 43.1565 | 6.4000 | 70.41 | 1.487490 |
| 22 | 2497.5000 | 1.8000 | 25.50 | 1.804580 |
| 23 | 266.6630 | 9.4000 | | 1.000000 |
| 24 | ∞ | 2.0000 | | 1.000000 |
| 25 | 499.7065 | 1.5000 | 45.00 | 1.744000 |
| 26 | 28.6057 | 16.7000 | | 1.000000 |
| 27 | 86.0991 | 3.3000 | 41.96 | 1.667550 |
| 28 | −193.7907 | Bf | | 1.000000 |

Variations in the spacings in the magnification change in Table 4 above are shown below.

| | Wide Angle End (W) | Telephoto End (T) |
|---|---|---|
| f | 80.94 | 196.00 |
| Do | ∞ | ∞ |
| d5 | 2.6197 | 42.4205 |
| d13 | 26.3473 | 1.9032 |
| d18 | 17.40616 | 2.04936 |
| Bf | 65.9844 | 65.9845 |

Since in any of the above-described embodiments, the present invention is applied to a four-unit afocal type zoom lens, the magnification of the third lens unit is always constant during the magnification change of the entire zoom lens, and the third lens unit constitutes a parallel relay system with the fourth lens unit and therefore is a lens unit of the simplest construction among all four lens units.

Therefore, there is an advantage that even if as in each of the above-described embodiments, an image stabilizing mechanism is provided in the third lens unit, the bulkiness of the zoom lens system (configuration) will be suppressed and the structure of the displacing mechanism for image stabilization will become relatively simple in construction.

As described above, according to the first invention, there can be provided a zoom lens equipped with the image stabilizing function and of which the bulkiness can be suppressed even if the image stabilizing function is added and in which various aberrations are corrected well and which has an excellent imaging characteristic and a high performance.

Particularly, the present invention is suitable for a so-called four-unit zoom lens of the type in which an afocal zoom converter is formed by first to third lens units, and is of a construction best suited for a zoom lens of the so-called photographic telephoto region.

However, the first lens unit and the fourth lens unit can also be made movable during magnification change to thereby make the magnification change ratio great or improve the imaging characteristic during magnification change and therefore, the present invention is also applicable to such a zoom type.

The second invention will hereinafter be described in greater detail with respect to some embodiments thereof. Any of fourth to six embodiments which will be described herein has, in succession from the object side, a first lens unit G1 having positive refractive power, a second lens unit G2 having negative refractive power, a third lens unit G3 having positive refractive power, and a fourth lens unit G4 having positive refractive power, said first lens unit G1, said third lens unit G3 and said fourth lens unit G4 being moved toward the object side during the magnification change from the wide angle end to the telephoto end, and is provided with image position displacing means for moving said second lens unit G2 in a direction substantially orthogonal to the optical axis to thereby effect image stabilization, and satisfies the following condition:

$$\Delta Y = (1-\beta_2) \cdot \beta_{34} \cdot \Delta S, \tag{9}$$

where $\Delta S$ is the amount of movement of said second lens unit G2 in the direction substantially orthogonal to the optical axis, $\beta_2$ is the image magnification of the second lens unit G2, $\beta_{34}$ is the combined image magnification of said third lens unit G3 and said fourth lens unit G4, and $\Delta Y$ is the amount of movement of the image.

Three embodiments of the present invention will be described here, but describing each embodiment briefly, the fourth embodiment is one in which the second lens unit is fixed, and the fifth and sixth embodiments are ones in which the second lens unit is slightly displaced during magnification change.

The design numerical values of the three embodiments of the present invention and the corresponding numerical values, etc. of the respective conditions are shown in Table 5 below. Any of these embodiments satisfies the condition of the aforementioned expression (9), but numerical values at the wide angle end (W) and the telephoto end (T) are enumerated as reference values. The numerical values show some examples in the respective embodiments, and substantially satisfy the condition of expression (9) over all of the zoom magnification change area. Also, the amount of image stabilization displacement (the amount of movement during the image stabilizing operation) of the second lens G2 is controlled so as to satisfy the condition of expression (13).

TABLE 5

Condition-Corresponding Numerical Values of Embodiments 4 to 6

| Conditional Expressions | Corresponding Mathematical Expressions, etc. | | 4th Embodiment 70–250 mm F3.5–4.5 | 5th Embodiment 35–105 mm F3.5–4.5 | 6th Embodiment 35–135 mm F3.5–4.5 |
|---|---|---|---|---|---|
| Expression (9) | $\beta_2$ | (W) | −0.39971 | −0.37732 | −0.36902 |
| | | (T) | −1.00095 | −0.71595 | −0.88457 |
| | $\beta_{34}$ | (W) | −1.426055 | −1.337217 | −1.337643 |
| | | (T) | −1.976957 | −2.016312 | −2.030666 |
| | $\Delta S$ | (W) | 0.117 | 0.065 | 0.066 |
| | | (T) | 0.205 | 0.099 | 0.114 |
| | $\Delta Y$ | (W) | −0.233 | −0.120 | −0.120 |
| | | (T) | −0.810 | −0.343 | −0.437 |
| Expression (10) | $f_2$ | | −32.4 | −16.808 | −16.602 |
| | $(f_W f_T)^{1/2}$ | | 130.422 | 60.893 | 68.673 |
| | $|f_2/(f_W f_T)^{1/2}|$ | | 0.248 | 0.276 | 0.242 |
| Expression (11) | $\Delta_2$ | | 0 | +3.72 | +0.491 |
| | $\Delta_2/f_W$ | | 0 | 0.1032 | 0.0136 |
| Expression (12) | $\Delta S_{max}$ | | 0.205 | 0.099 | 0.114 |
| | $f_2$ | | −32.4 | −16.808 | −16.602 |
| | $\Delta S_{max}/|f_2|$ | | 0.00631 | 0.0059 | 0.00687 |
| Expression (14) | $r$ | | 45.515 | 12.749 | 15.051 |
| | $f_2$ | | −32.4 | −16.808 | −16.602 |
| | $r/f_2$ | | −1.405 | −0.7585 | −0.9066 |
| Expression (15) | $L$ | | 13.8 | 12 | 14.5 |
| | $f_W$ | | 70 | 36 | 36 |
| | $L/f_W$ | | 0.197 | 0.333 | 0.403 |

The numerical values in expression (9) indicate the calculated values at the wide angle end (W) and the telephoto end (T) in each embodiment and the amount of image stabilization displacement ΔS of the second lens unit and the amount of movement ΔY of the image.

Figure 4:
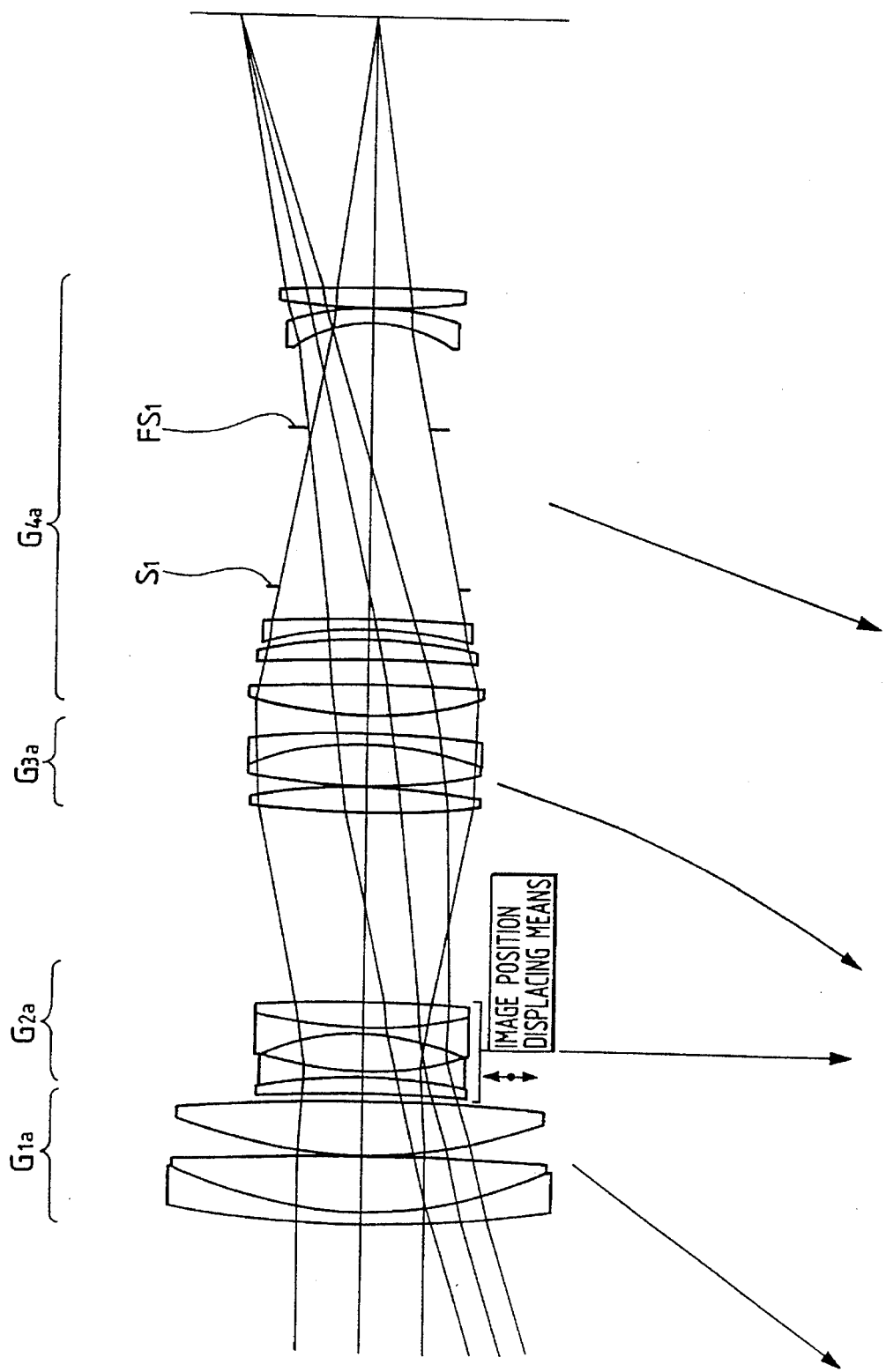
FIG. 4 is an illustration schematically showing the construction of an image stabilizing zoom lens according to a fourth embodiment of the present invention.

The respective embodiments will hereinafter be described individually. The construction of an image stabilizing zoom lens according to the fourth embodiment of the present invention is schematically shown in FIG. 4. The fourth embodiment is one in which the present invention is applied to a zoom lens of the so-called telephoto region, and the focal length thereof is 70 to 250 mm and the F number (F) thereof is F3.5 to 4.5. This embodiment is a typical type as the zoom lens, and has a magnification changing performance equal to that of commercially available popular products.

The zoom lens shown in this embodiment, as is apparent from FIG. 4, is of a four-unit construction comprising lens units G1a to G4a, and the second lens unit G2a is not moved during the magnification change from the wide angle end to the telephoto end, and is fixed to a lens barrel (not shown). The other lens units are moved toward the object side during this magnification change, as shown in FIG. 4.

The second lens unit G2a is made movable in the direction orthogonal to the optical axis, and provision is made of displacing means controlled so as to detect the vibration or the like of the entire lens and effect predetermined displacement.

The fourth lens unit G4a is provided with the aperture stop S1 of the zoom lens system according to this embodiment, and a fixed stop FS1 is provided on the image side thereof. Discretely from these, a fixed flare stop for intercepting unnecessary light when the second lens unit G2a is displaced during image stabilization may preferably be provided. The location of this fixed flare stop is not specifically restricted, but yet is preferable to provide it near the image side of the second lens unit G2a.

The design numerical values, etc. of the respective lenses in the fourth embodiment are shown in Table 6 below. The numbers at the left end in the table below indicate the order of the lens surfaces from the object side.

TABLE 6

Design Numerical Values, etc. in the Fourth Embodiment

| Surface | Radius of Curvature | Inter-surface Spacing | Abbe Number | Refractive Index |
|---|---|---|---|---|
| 1 | 183.3090 | 1.7000 | 35.19 | 1.749501 |
| 2 | 69.4050 | 8.5000 | 70.41 | 1.487490 |
| 3 | −615.4050 | 0.2000 | | 1.000000 |
| 4 | 84.4930 | 8.0000 | 70.41 | 1.487490 |
| 5 | −360.9413 | d5 | | 1.000000 |
| 6 | −224.0702 | 2.3000 | 30.04 | 1.698950 |
| 7 | −93.7440 | 0.9000 | 45.37 | 1.796681 |
| 8 | 45.5150 | 5.7000 | | 1.000000 |
| 9 | −35.7880 | 0.9000 | 61.09 | 1.589130 |
| 10 | 68.8810 | 4.0000 | 23.20 | 1.908370 |
| 11 | −266.5891 | d11 | | 1.000000 |
| 12 | 154.8970 | 3.8000 | 48.97 | 1.531721 |
| 13 | −105.1390 | 0.2000 | | 1.000000 |
| 14 | 86.9390 | 6.8000 | 65.77 | 1.464500 |
| 15 | −45.7760 | 1.5000 | 28.56 | 1.795040 |
| 16 | −163.5798 | d16 | | 1.000000 |
| 17 | 55.2610 | 5.0000 | 54.01 | 1.617200 |
| 18 | −244.8259 | 3.9000 | | 1.000000 |
| 19 | −374.0650 | 3.2000 | 65.77 | 1.464500 |
| 20 | −71.4910 | 1.4000 | | 1.000000 |
| 21 | −72.0630 | 1.6000 | 25.35 | 1.805182 |
| 22 | −250.4765 | 5.0000 | | 1.000000 |
| 23 | ∞ | 25.0000 | | 1.000000 |
| 24 | ∞ | 16.2000 | | 1.000000 |
| 25 | −22.7570 | 2.3000 | 53.93 | 1.713000 |
| 26 | −41.2750 | 0.1000 | | 1.000000 |
| 27 | 155.3610 | 2.8000 | 33.75 | 1.648311 |
| 28 | −200.5931 | Bf | | 1.000000 |

Variations in the spacings by magnification change in Table 6 above are shown below.

| | Wide Angle End (W) | Telephoto End (T) |
|---|---|---|
| f | 70.00 | 243.00 |
| Do | ∞ | ∞ |
| d5 | 1.2902 | 49.9797 |
| d11 | 29.0850 | 0.9461 |
| d16 | 2.7559 | 6.5500 |
| Bf | 41.1350 | 65.4824 |

Particularly, in the present embodiment, the second lens unit G2a is not moved in the direction of the optical axis and therefore, a moving mechanism for the magnification changing operation is not required. Therefore, the displacing means for image stabilization can be mounted directly on the lens barrel and thus, any operational error is not liable to occur and moreover, the compactness of the lens system can be achieved.

Figure 5:
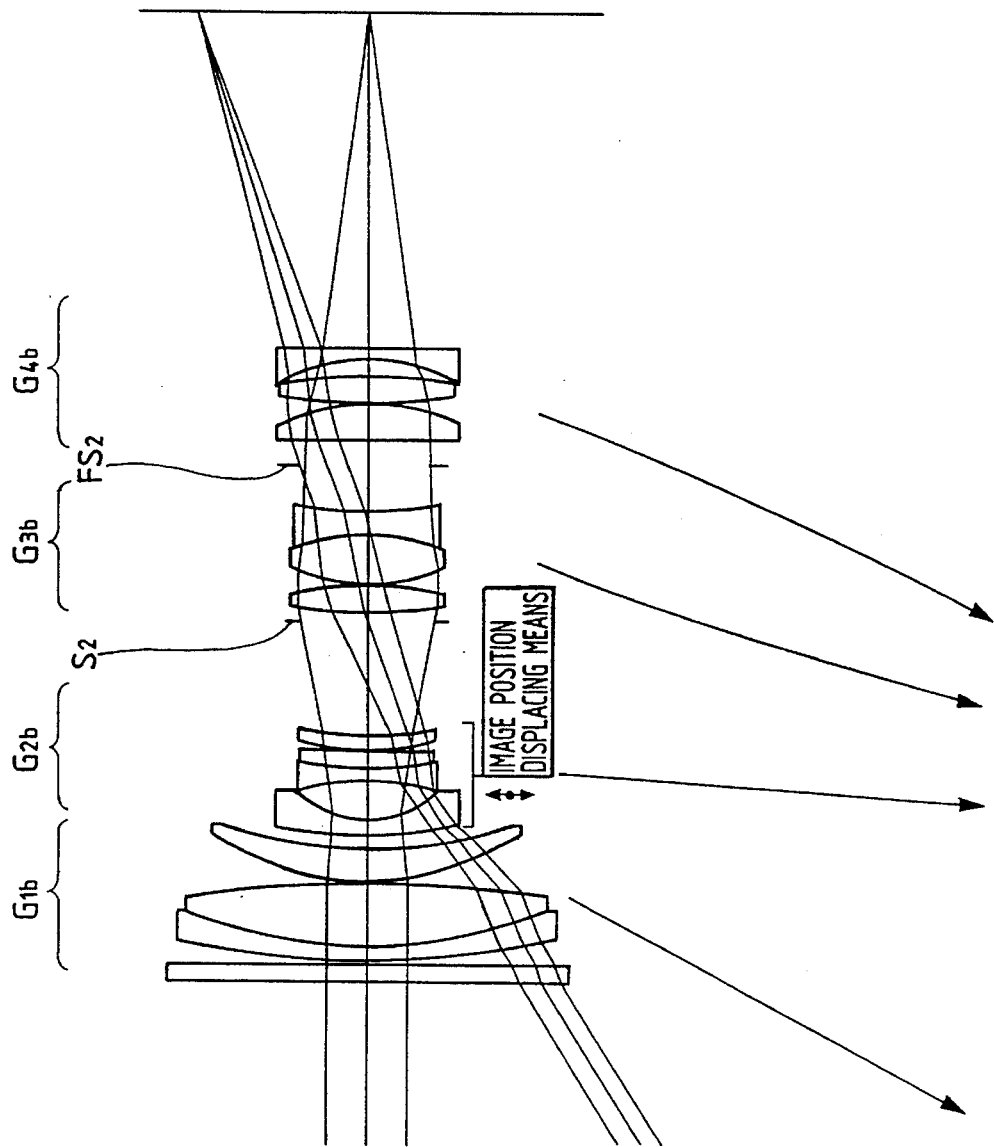
FIG. 5 is an illustration schematically showing the construction of an image stabilizing zoom lens according to a fifth embodiment of the present invention.

The fifth embodiment of the present invention will now be described. The construction of an image stabilizing zoom lens according to the fifth embodiment is schematically shown in FIG. 5. This embodiment is one in which the present invention is applied to a zoom lens of the so-called standard region, and the focal length thereof is 35 to 105 mm and the F number thereof is F3.5 to 4.5.

The zoom lens shown in this embodiment, like the above-described fourth embodiment, is of a four-unit construction comprising lens units G1b to G4b, but a filter is disposed most adjacent to the object side and the second lens unit G2b is also moved minutely during the magnification change from the wide angle end to the telephoto end.

Further, the second lens unit G2b is made movable in the direction orthogonal to the optical axis, and provision is made of displacing means controlled so as to detect the vibration or the like of the entire lens and effect predetermined displacement.

The aperture stop S2 of the zoom lens according to this embodiment is provided near the object side of the third lens unit G3b, and a fixed stop FS2 is provided near the object side of the fourth lens unit G4b. Discretely from these, a fixed flare stop for intercepting unnecessary light when the second lens unit G2b is displaced during image stabilization may preferably be provided. The location of this fixed flare stop is not specifically restricted, but yet it is preferable to provide it near the image side of the second lens unit G2b.

The design numerical values of the respective lenses in the fifth embodiment are shown in Table 7 below. The numbers at the left end in the table below indicate the order of the lens surfaces from the object side, and the eighth surface marked with * is an aspherical surface. The conditions, etc. of this spherical surface will be described later.

TABLE 7

Design Numerical Values, etc. in the Fifth Embodiment

| Surface | Radius of Curvature | Inter-surface Spacing | Abbe Number | Refractive Index |
|---|---|---|---|---|
| 1 | ∞ | 2.0000 | 58.80 | 1.522160 |
| 2 | ∞ | 0.8000 | | 1.000000 |
| 3 | 110.4865 | 1.5000 | 23.01 | 1.860741 |
| 4 | 57.2840 | 8.0000 | 69.98 | 1.518601 |
| 5 | −131.9844 | 0.1000 | | 1.000000 |
| 6 | 33.7652 | 3.8000 | 58.50 | 1.651599 |
| 7 | 56.5110 | d7 | | 1.000000 |
| *8 | 52.5915 | 0.0300 | 56.34 | 1.497120 |
| 9 | 53.9890 | 1.4700 | 57.53 | 1.670249 |
| 10 | 12.7492 | 5.1000 | | 1.000000 |
| 11 | −25.4131 | 1.1000 | 52.30 | 1.748099 |
| 12 | 33.3440 | 2.3000 | 23.01 | 1.860741 |
| 13 | 165.5122 | 0.1000 | | 1.000000 |
| 14 | 26.8066 | 1.9000 | 25.50 | 1.804581 |
| 15 | 49.1895 | d15 | | 1.000000 |
| 16 | ∞ | 1.0000 | | 1.000000 |
| 17 | 47.9463 | 3.5000 | 69.98 | 1.518601 |
| 18 | −40.6059 | 0.1000 | | 1.000000 |
| 19 | 20.8770 | 6.2000 | 56.41 | 1.501370 |
| 20 | −21.7960 | 3.0000 | 33.89 | 1.803840 |
| 21 | 64.2939 | 5.6000 | | 1.000000 |
| 22 | ∞ | d22 | | 1.000000 |
| 23 | −2621.4777 | 4.5000 | 50.84 | 1.658440 |
| 24 | −23.2791 | 0.1000 | | 1.000000 |
| 25 | 77.4828 | 3.3000 | 57.03 | 1.622801 |
| 26 | −53.6723 | 2.4000 | | 1.000000 |
| 27 | −19.2976 | 1.2000 | 40.90 | 1.796310 |
| 28 | −219.1863 | Bf | | 1.000000 |

Variations in the spacing by magnification change in Table 7 above are shown below.

| | Wide Angle End (W) | Telephoto End (T) |
|---|---|---|
| f | 36.00 | 103.00 |
| Do | ∞ | ∞ |
| d7 | 2.2259 | 23.2943 |
| d15 | 14.4025 | 2.0142 |
| d22 | 3.0662 | 1.1565 |
| Bf | 41.0847 | 59.1000 |

In the present embodiment, the second lens unit G2b is designed to be moved in the direction of the optical axis during magnification change, but the amount of movement thereof is minute and therefore, the construction of a moving mechanism for the magnification changing operation can be simplified and thus, even if displacing means for image stabilization is provided, the unnecessary bulkiness of the lens system could be prevented. Further, for any of the magnification changing operation and the image stabilizing operation, the operational error can be suppressed to a very minute range.

Figure 6:
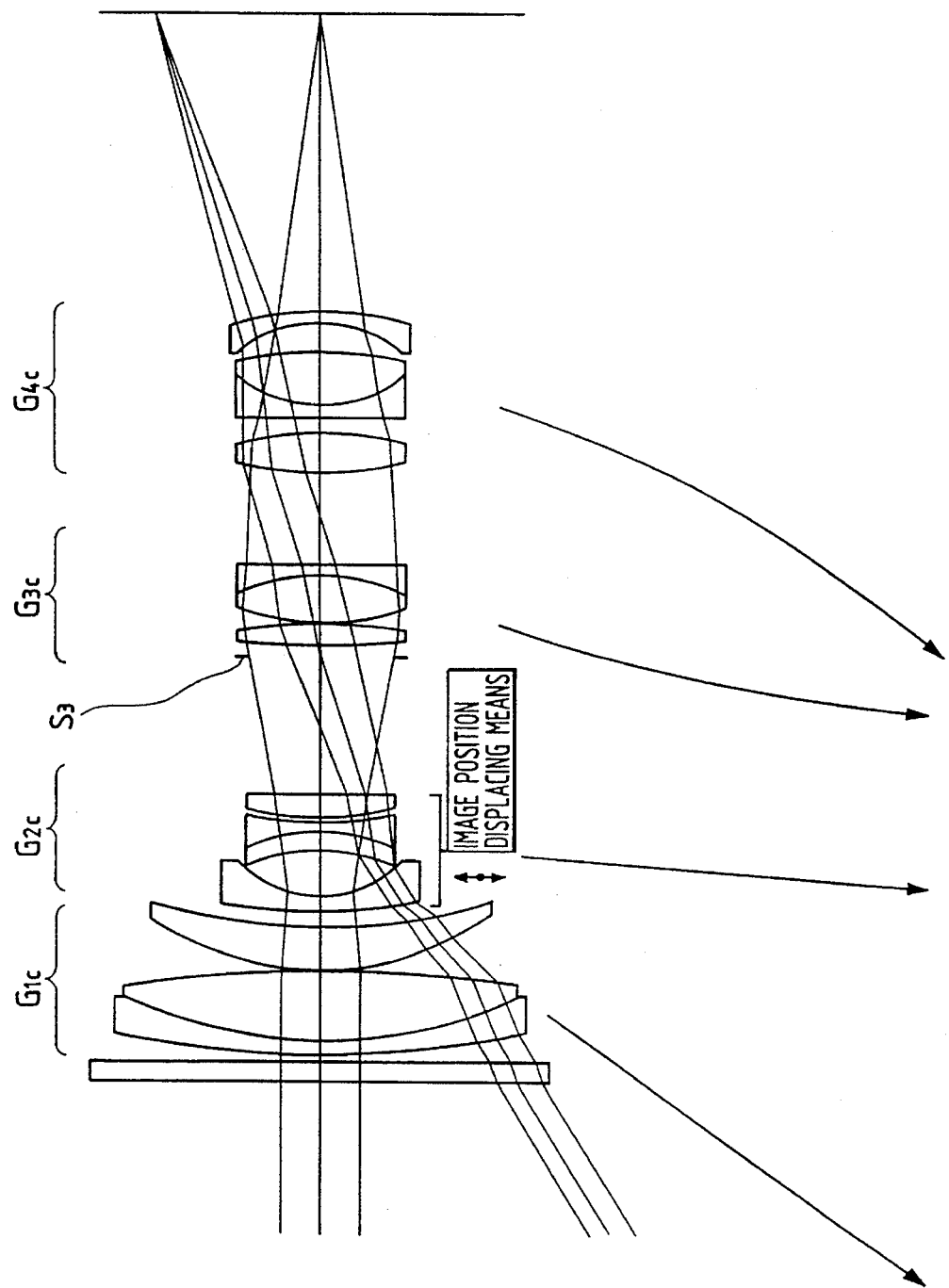
FIG. 6 is an illustration schematically showing the construction of an image stabilizing zoom lens according to a sixth embodiment of the present invention.

The sixth embodiment of the present invention will now be described. The construction of an image stabilizing zoom lens according to the sixth embodiment is schematically shown in FIG. 6. This embodiment is one in which the present invention is applied to a zoom lens of the so-called standard region, and the focal length thereof is 35 to 135 mm and the F number thereof is F3.5 to 4.5. Further, it is designed such that the zoom ratio is 4, and is of a relatively high magnification as a zoom lens.

The zoom lens shown in this embodiment, like each of the above-described embodiments, is of a four-unit construction comprising lens units G1c to G4c, but a filter is disposed most adjacent to the object side, and the second lens unit G2c is moved minutely toward the object side during the magnification change from the wide angle end to the telephoto end.

Further, the second lens unit G2c is made movable in the direction orthogonal to the optical axis, and provision is made of displacing means controlled so as to detect the vibration or the like of the entire lens and effect predetermined displacement.

The aperture stop S3 of the zoom lens according to the sixth embodiment is provided near the object side of the third lens unit G3c, and discretely therefrom, a fixed flare stop for intercepting unnecessary light when the second lens unit G2c is displaced during image stabilization may preferably be provided.

The design numerical values of the respective lenses in the sixth embodiment are shown in Table 8 below. The numbers at the left end in the table below indicate the order of the lens surfaces from the object side, and the eighth surface marked with * is an aspherical surface. The conditions, etc. of this aspherical surface will be described later.

TABLE 8

Design Numerical Values, etc. in the Sixth Embodiment

| Surface | Radius of Curvature | Inter-surface Spacing | Abbe Number | Refractive Index |
|---|---|---|---|---|
| 1 | ∞ | 2.5000 | 64.10 | 1.516800 |
| 2 | ∞ | .8000 | | 1.000000 |
| 3 | 115.7400 | 1.8000 | 25.50 | 1.804581 |
| 4 | 58.2897 | 9.3000 | 69.98 | 1.518601 |
| 5 | −162.3440 | .1000 | | 1.000000 |
| 6 | 37.7114 | 5.3000 | 60.14 | 1.620409 |
| 7 | 74.1044 | d7 | 56.34 | 1.000000 |
| *8 | 71.9757 | .0300 | 56.34 | 1.497120 |
| 9 | 71.9757 | 1.4700 | 49.45 | 1.772789 |
| 10 | 15.0513 | 5.8000 | | 1.000000 |
| 11 | −25.8491 | 2.7000 | 25.50 | 1.804581 |
| 12 | −19.5436 | 1.2000 | 52.30 | 1.748099 |
| 13 | 70.4030 | .5000 | | 1.000000 |
| 14 | 38.5886 | 2.8000 | 23.01 | 1.860741 |
| 15 | 419.4661 | d15 | | 1.000000 |
| 16 | ∞ | 1.3000 | | 1.000000 |
| 17 | 87.1471 | 2.9000 | 64.10 | 1.516800 |
| 18 | −61.0730 | .1000 | | 1.000000 |
| 19 | 27.3255 | 6.3000 | 60.23 | 1.518350 |
| 20 | −25.0149 | 1.5000 | 33.89 | 1.803840 |
| 21 | −1746.1922 | d21 | | 1.000000 |
| 22 | 35.4963 | 5.3000 | 69.98 | 1.518601 |
| 23 | −42.1821 | 1.9000 | | 1.000000 |
| 24 | 252.1109 | 1.5000 | 33.89 | 1.803840 |
| 25 | 16.4778 | 7.0000 | 36.98 | 1.612930 |
| 26 | −57.6121 | 4.0000 | | 1.000000 |
| 27 | −17.0684 | 1.5000 | 49.45 | 1.772789 |
| 28 | −36.4655 | Bf | | 1.000000 |

Variations in the spacings by magnification change in Table 8 above are shown below.

|  | Wide Angle End (W) | Telephoto End (T) |
| --- | --- | --- |
| f | 36.00 | 131.00 |
| Do | ∞ | ∞ |
| d7 | 2.6187 | 28.8398 |
| d15 | 18.0101 | 2.0865 |
| d21 | 12.0141 | 8.3941 |
| Bf | 38.7946 | 58.8296 |

In the present embodiment, the second lens unit G2c is designed to be moved in the direction of the optical axis during magnification change, but as in the above-described fifth embodiment, the amount of movement thereof is minute and therefore, the construction of the moving mechanism for the magnification changing operation can be simplified and thus, even if displacing means for image stabilization is provided, the unnecessary bulkiness of the lens system could be prevented. Further, for both of the magnification changing operation and the image stabilizing operation, the operational error can be suppressed to a very minute range.

Also, in the fifth and sixth embodiments, an aspherical surface is adopted in the second lens unit, and the design conditional expression of this aspherical surface is given by the following expression (16):

$$X(y) = \frac{Cy^2}{1 + \sqrt{(1 - kC^2y^2)}} + A_2y^2 + A_4y^4 + A_6y^6 + A_8y^8 + A_{10}y^{10}, \quad (16)$$

where X(y) is the distance from the tangential plane on the lens vertex to the aspherical surface as measured in the direction of the optical axis, y is the height from the optical axis on the aspherical surface, k is a cone constant, $A_n$ is the aspherical surface coefficient, C is the curvature (1/r) and r is the radius of curvature at the lens vertex. The numerical values of this conditional expression are shown in Table 9 below.

TABLE 9

Corresponding Numerical Values, etc. of the Conditional Expression of the Aspherical Surface

| Conditional Expression | Corresponding Numerical Values, etc. | 5th Embodiment | 6th Embodiment |
| --- | --- | --- | --- |
| Expression (16) | k | 1.0000 | 1.0000 |
| | $A_2$ | 0.0000 | 0.0000 |
| | $A_4$ | $-4.96200 \times 10^{-6}$ | $-4.28310 \times 10^{-6}$ |
| | $A_6$ | $-8.28300 \times 10^{-8}$ | $-3.65300 \times 10^{-8}$ |
| | $A_8$ | $4.41600 \times 10^{-10}$ | $1.65450 \times 10^{-10}$ |
| | $A_{10}$ | $-1.61200 \times 10^{-12}$ | $-4.75350 \times 10^{-13}$ |

As shown above, in the fifth and sixth embodiments, an aspherical surface is adopted as that surface (the eighth surface) in the second lens unit which is most adjacent to the object side and therefore, coupled with the effect by the other conditions of the present embodiment, an excellent imaging performance is obtained both during magnification change and during image stabilization.

As described above, according to the second invention, there can be provided a zoom lens equipped with the image stabilization function of which the bulkiness can be prevented even if the image stabilizing function is added and in which various aberrations are corrected well and which has an excellent imaging performance.

What is claimed is:

1. A zoom lens equipped with an image stabilizing function, comprising, in order from the object side, a first lens unit having positive refractive power, a second lens unit having negative refractive power, a third lens unit having positive refractive power, and a fourth lens unit having positive refractive power, wherein, during magnification change from the wide angle end to the telephoto end, said second lens unit is moved toward the image side for magnification change, wherein said zoom lens includes image position displacing means for moving said third lens unit in a direction substantially orthogonal to the optical axis to effect image stabilization, and said zoom lens satisfies the following condition:

$$\Delta Y = f_4/f_3 \cdot \Delta S,$$

where $\Delta S$ is the amount of movement of the third lens unit in the direction substantially orthogonal to the optical axis, $f_3$ is the focal length of the third lens unit, $f_4$ is the focal length of the fourth lens unit, and $\Delta Y$ is the amount of movement of the image during magnification change.

2. A zoom lens equipped with an image stabilizing function according to claim 1, said zoom lens satisfying the following conditions:

$$0.5 < f_3/(f_W \cdot f_T)^{1/2} < 1$$

$$\Delta Smax/f_3 < 0.1,$$

where $f_W$ is the focal length of the zoom lens at the wide angle end, $f_T$ is the focal length of the zoom lens at the telephoto end, and $\Delta Smax$ is the maximum amount of displacement of said third lens unit during image stabilization.

3. A zoom lens equipped with an image stabilizing function according to claim 1, further comprising a flare stop for intercepting unnecessary light when said third lens unit is moved in the direction substantially orthogonal to the optical axis for image stabilization and that is disposed in a fixed relationship with the optical axis.

4. A zoom lens equipped with an image stabilizing function according to claim 2, further comprising a flare stop for intercepting unnecessary light when said third lens unit is moved in the direction substantially orthogonal to the optical axis for image stabilization and that is disposed in a fixed relationship with the optical axis.

5. A zoom lens equipped with an image stabilizing function according to claim 1, wherein said third lens unit includes at least one convex lens and a concave lens.

6. A zoom lens equipped with an image stabilizing function according to claim 2, wherein said third lens unit includes at least one convex lens and a concave lens.

7. A zoom lens equipped with an image stabilizing function according to claim 5, said zoom lens satisfying the following conditions:

$$0.5 < rt/f_3 < 20$$

$$L/f_W < 0.3,$$

where rt is the radius of curvature of the object side surface of the convex lens in the third lens unit which is most adjacent to the image side, and L is the length of the third lens unit as measured along the optical axis.

8. A zoom lens equipped with an image stabilizing function according to claim 6, said zoom lens satisfying the following conditions:

$$0.5 < rt/f_3 < 20$$

$L/f_W<0.3$, where rt is the radius of curvature of the object side surface of the convex lens in the third lens unit which is most adjacent to the image side, and L is the length of the third lens unit as measured along the optical axis.

9. A zoom lens equipped with an image stabilizing function according to claim 5, satisfying said zoom lens satisfies the following conditions:

$0.1<\Delta nd<0.4$ $15<\Delta vd<50$, where $\Delta nd$ is the average value of the refractive index of the concave lens of the third lens unit, minus the average value of the refractive index of the convex lens, and $\Delta vd$ is the average value of the Abbe number of the convex lens of the third lens unit, minus the average value of the Abbe number of the concave lens.

10. A zoom lens equipped with an image stabilizing function according to claim 6, said zoom lens satisfying the following conditions:

$0.1<\Delta nd<0.4$ $15<\Delta vd<50$, where $\Delta nd$ is the average value of the refractive index of the concave lens of the third lens unit, minus the average value of the refractive index of the convex lens, and $\Delta vd$ is the average value of the Abbe number of the convex lens of the third lens unit, minus the average value of the Abbe number of the concave lens.

11. A zoom lens equipped with an image stabilizing function, comprising, in order from the object side, a first lens unit having positive refractive power, a second lens unit having negative refractive power, a third lens unit having positive refractive power, and a fourth lens unit having positive refractive power, wherein, during magnification change from the wide angle end to the telephoto end, said first lens unit, said third lens unit, and said fourth lens unit are moved toward the object side, wherein said zoom lens includes image position displacing means for moving said second lens unit in a direction substantially orthogonal to the optical axis to effect image stabilization, and said zoom lens satisfies the following condition:

$\Delta Y=(1-\beta_2)\cdot\beta_{34}\cdot\Delta S$, where $\Delta S$ is the amount of movement of said second lens unit in the direction substantially orthogonal to the optical axis, $\beta_2$ is the image magnification of said second lens unit, $\beta_{34}$ is the combined image magnification of said third lens unit and said fourth lens unit, and $\Delta Y$ is the amount of movement of the image.

12. A zoom lens equipped with an image stabilizing function according to claim 11, said zoom lens satisfying the following conditions:

$0.15<|f_2/(f_W f_T)^{1/2}|<1.0$ $-1.0<\Delta_2/f_W<0.2$ $\Delta Smax/|f_2|<0.1$, where $f_2$ is the focal length of said second lens unit, $f_W$ is the focal length of the zoom lens at the wide angle end, $f_T$ is the focal length of the zoom lens at the telephoto end, $\Delta Smax$ is the maximum amount of displacement of said second lens unit during image stabilization, and $\Delta_2$ is the amount of movement of said second lens unit in the direction of the optical axis during the magnification changing operation, wherein movement toward the object side is positive and movement toward the image side is negative.

13. A zoom lens equipped with an image stabilizing function according to claim 11, further comprising a flare stop for intercepting unnecessary light when said second lens unit is moved in the direction substantially orthogonal to the optical axis for image stabilization and that is disposed in a fixed relationship with the optical axis.

14. A zoom lens equipped with an image stabilizing function according to claim 12, further comprising a flare stop for intercepting unnecessary light when said second lens unit is moved in the direction substantially orthogonal to the optical axis for image stabilization and that is disposed in a fixed relationship with the optical axis.

15. A zoom lens equipped with an image stabilizing function according to claim 12, said zoom lens satisfying the following conditions:

$-1.7<r_-/f_2<-0.5$ $L/f_W<0.5$, where $r_-$ is the radius of curvature of the image side surface of the concave lens in said second lens unit which is most adjacent to the object side, and L is the length of the second lens unit as measured along the optical axis.

16. A zoom lens equipped with an image stabilizing function according to claim 11, wherein a surface in said second lens unit which is most adjacent to the object side is aspherical, the aspherical surface being given by:

$$X(y)=\frac{Cy^2}{1+\sqrt{(1-kC^2y^2)}}+A_2y^2+A_4y^4+A_6y^6+A_8y^8+A_{10}y^{10},$$

where $X(y)$ is the distance from the tangential plane on the lens vertex to the aspherical surface as measured in the direction of the optical axis, y is the height from the optical axis on the aspherical surface, k is a cone constant, $A_n$ is the aspherical surface coefficient, C is the curvature (1/r), and r is the radius of curvature at the lens vertex.

17. A zoom lens equipped with an image stabilizing function, comprising, in order from the object side, a first lens unit having positive refractive power, a second lens unit having negative refractive power, a third lens unit having positive refractive power, and a fourth lens unit having positive refractive power, wherein, during magnification change from the wide angle end to the telephoto end, said second lens unit is moved toward the image side for magnification change, wherein said third lens unit is moved in a direction substantially orthogonal to the optical axis to effect image stabilization of said zoom lens, and said zoom lens satisfies the following condition:

$\Delta Y=f_4/f_3\cdot\Delta S$, where $\Delta S$ is the amount of movement of the third lens unit in the direction substantially orthogonal to the optical axis, $f_3$ is the focal length of the third lens unit, $f_4$ is the focal length of the fourth lens unit, and $\Delta Y$ is the amount of movement of the image during magnification change.

18. A zoom lens equipped with an image stabilizing function according to claim 17, said zoom lens satisfying the following conditions:

$0.5<f_3/(f_W f_T)^{1/2}<1$ $\Delta Smax/f_3<0.1$, where $f_W$ is the focal length of the zoom lens at the wide angle end, $f_T$ is the focal length of the zoom lens at the telephoto end, and $\Delta S\max$ is the maximum amount of displacement of said third lens unit during image stabilization.

19. A zoom lens equipped with an image stabilizing function according to claim 17, further comprising a flare stop for intercepting unnecessary light when said third lens unit is moved in the direction substantially orthogonal to the optical axis for image stabilization and that is disposed in a fixed relationship with the optical axis.

20. A zoom lens equipped with an image stabilizing function according to claim 18, further comprising a flare stop for intercepting unnecessary light when said third lens unit is moved in the direction substantially orthogonal to the optical axis for image stabilization and that is disposed in a fixed relationship with the optical axis.

21. A zoom lens equipped with an image stabilizing function according to claim 17, wherein said third lens unit includes at least one convex lens and a concave lens.

22. A zoom lens equipped with an image stabilizing function according to claim 18, wherein said third lens unit includes at least one convex lens and a concave lens.

23. A zoom lens equipped with an image stabilizing function according to claim 21, said zoom lens satisfying the following conditions:

$$0.5 < rt/f_3 < 20$$

$$L/f_W < 0.3,$$

where rt is the radius of curvature of the object side surface of the convex lens in the third lens unit which is most adjacent to the image side, and L is the length of the third lens unit as measured along the optical axis.

24. A zoom lens equipped with an image stabilizing function according to claim 22, said zoom lens satisfying the following conditions:

$$0.5 < rt/f_3 < 20$$

$$L/f_W < 0.3,$$

where rt is the radius of curvature of the object side surface of the convex lens in the third lens unit which is most adjacent to the image side, and L is the length of the third lens unit as measured along the optical axis.

25. A zoom lens equipped with an image stabilizing function according to claim 21, said zoom lens satisfying the following conditions:

$$0.1 < \Delta nd < 0.4$$

$$15 < \Delta vd < 50,$$

where $\Delta nd$ is the average value of the refractive index of the concave lens of the third lens unit, minus the average value of the refractive index of the convex lens, and $\Delta vd$ is the average value of the Abbe number of the convex lens of the third lens unit, minus the average value of the Abbe number of the concave lens.

26. A zoom lens equipped with an image stabilizing function according to claim 22, said zoom lens satisfying the following conditions:

$$0.1 < \Delta nd < 0.4$$

$$15 < \Delta vd < 50,$$

where $\Delta nd$ is the average value of the refractive index of the concave lens of the third lens unit, minus the average value of the refractive index of the convex lens, and $\Delta vd$ is the average value of the Abbe number of the convex lens of the third lens unit, minus the average value of the Abbe number of the concave lens.

27. A zoom lens equipped with an image stabilizing function, comprising, in order from the object side, a first lens unit having positive refractive power, a second lens unit having negative refractive power, a third lens unit having positive refractive power, and a fourth lens unit having positive refractive power, wherein, during magnification change from the wide angle end to the telephoto end, said first lens unit, said third lens unit, and said fourth lens unit are moved toward the object side, wherein said second lens unit is moved in a direction substantially orthogonal to the optical axis to effect image stabilization of said zoom lens and said zoom lens satisfies the following condition:

$$\Delta Y = (1-\beta_2) \cdot \beta_{34} \cdot \Delta S,$$

where $\Delta S$ is the amount of movement of said second lens unit in the direction substantially orthogonal to the optical axis, $\beta_2$ is the image magnification of said second lens unit, $\beta_{34}$ is the combined image magnification of said third lens unit and said fourth lens unit, and $\Delta Y$ is the amount of movement of the image.

28. A zoom lens equipped with an image stabilizing function according to claim 27, said zoom lens satisfying the following conditions:

$$0.15 < |f_2/(f_W \cdot f_T)^{1/2}| < 1.0$$

$$-1.0 < \Delta_2/f_W < 0.2$$

$$\Delta S\max/|f_2| < 0.1,$$

where $f_2$ is the focal length of said second lens unit, $f_W$ is the focal length of the zoom lens at the wide angle end, $f_T$ is the focal length of the zoom lens at the telephoto end, $\Delta S\max$ is the maximum amount of displacement of said second lens unit during image stabilization, and $\Delta_2$ is the amount of movement of said second lens unit in the direction of the optical axis during the magnification changing operation, wherein movement toward the object side is positive and movement toward the image side is negative.

29. A zoom lens equipped with an image stabilizing function according to claim 27, further comprising a flare stop for intercepting unnecessary light when said second lens unit is moved in the direction substantially orthogonal to the optical axis for image stabilization and that is disposed in a fixed relationship with the optical axis.

30. A zoom lens equipped with an image stabilizing function according to claim 28, further comprising a flare stop for intercepting unnecessary light when said second lens unit is moved in the direction substantially orthogonal to the optical axis for image stabilization and that is disposed in a fixed relationship with the optical axis.

31. A zoom lens equipped with an image stabilizing function according to claim 28, said zoom lens satisfying the following conditions:

$-1.7 < r_-/f_2 < -0.5$ $L/f_W < 0.5$ where $r_-$ is the radius of curvature of the image side surface of the concave lens in said second lens unit which is most adjacent to the object side, and L is the length of the second lens unit as measured along the optical axis.

32. A zoom lens equipped with an image stabilizing function according to claim 27, wherein a surface in said second lens unit which is most adjacent to the object side is aspherical, the aspherical surface being given by:

$$X(y) = \frac{Cy^2}{1 + \sqrt{(1 - kC^2y^2)}} + A_2y^2 + A_4y^4 + A_6y^6 + A_8y^8 + A_{10}y^{10},$$

where $X(y)$ is the distance from the tangential plane on the lens vertex to the aspherical surface as measured in the direction of the optical axis, y is the height from the optical axis on the aspherical surface, k is a cone constant, $A_n$ is the aspherical surface coefficient, C is the curvature (1/r), and r is the radius of curvature at the lens vertex.

* * * * *